United States Patent
Briggs

(10) Patent No.: US 9,133,373 B2
(45) Date of Patent: Sep. 15, 2015

(54) ELASTIC METHACRYLATE COMPOSITIONS

(71) Applicant: IPS CORPORATION, Compton, CA (US)

(72) Inventor: Paul C. Briggs, Chapel Hill, NC (US)

(73) Assignee: IPS CORPORATION, Compton, CA (US)

( * ) Notice: Subject to any disclaimer, the term of this patent is extended or adjusted under 35 U.S.C. 154(b) by 0 days.

(21) Appl. No.: 13/904,161

(22) Filed: May 29, 2013

(65) Prior Publication Data

US 2013/0261247 A1  Oct. 3, 2013

(51) Int. Cl.

| | | |
|---|---|---|
| *C09J 133/08* | (2006.01) | |
| *C09J 127/04* | (2006.01) | |
| *C09J 127/24* | (2006.01) | |
| *C08L 51/04* | (2006.01) | |
| *C08L 53/02* | (2006.01) | |
| *C09J 4/06* | (2006.01) | |
| *C09J 151/04* | (2006.01) | |
| *C09J 153/02* | (2006.01) | |

(52) U.S. Cl.
CPC ............... *C09J 133/08* (2013.01); *C08L 51/04* (2013.01); *C08L 53/02* (2013.01); *C09J 4/06* (2013.01); *C09J 127/04* (2013.01); *C09J 151/04* (2013.01); *C09J 153/02* (2013.01)

(58) Field of Classification Search
USPC .................................................. 525/88, 98
See application file for complete search history.

(56) References Cited

U.S. PATENT DOCUMENTS

| | | | | |
|---|---|---|---|---|
| 4,041,103 | A * | 8/1977 | Davison et al. | 525/92 B |
| 4,242,470 | A * | 12/1980 | Gergen et al. | 525/92 B |
| 5,026,609 | A * | 6/1991 | Jacob et al. | 428/489 |
| 5,059,656 | A * | 10/1991 | Tsuji | 525/155 |
| 5,945,461 | A * | 8/1999 | Gosiewski et al. | 521/123 |
| 6,034,159 | A * | 3/2000 | Malcolm | 524/293 |
| 6,559,257 | B2 * | 5/2003 | Quarmby | 526/271 |
| 2004/0118514 | A1 * | 6/2004 | Gosiewski et al. | 156/330 |
| 2008/0177004 | A1 * | 7/2008 | Osae et al. | 525/331.9 |

* cited by examiner

*Primary Examiner* — Jeffrey Mullis
(74) *Attorney, Agent, or Firm* — Scott R. Cox

(57) ABSTRACT

A two-part adhesive composition exhibiting improved elasticity wherein its composition includes one or more acrylate or methacrylate ester monomers, a sulfur bearing compound, preferably a sulfonyl chloride, an amine promoter, preferably, an amine aldehyde reaction product, and a thermoplastic block copolymer component selected from the group consisting of a. a linear styrene-butadiene-styrene copolymer
  b. a radial styrene-butadiene-styrene block copolymer with a plasticizer,
  c. a linear or radial styrene-isoprene-styrene block copolymer, and
  d. a linear or radial styrene-butadiene-isoprene-styrene block copolymer, and mixtures thereof.

10 Claims, No Drawings

ELASTIC METHACRYLATE COMPOSITIONS

CROSS REFERENCE TO RELATED APPLICATION

This Application is a continuation application of application Ser. No. 11/642,489, filed Dec. 20, 2006, which claims priority from Provisional Application No. 60/752,713, filed on Dec. 21, 2005.

FIELD OF INVENTION

This invention relates to liquid and paste compositions comprising mixtures of polymers and acrylic or methacrylate monomers that are hardened by free radical polymerization to form high strength, flexibilized materials. The hardened compositions are generally useful as adhesives, filling and repair materials, coatings and the like.

BACKGROUND OF THE INVENTION

Commercial and prior art methacrylate adhesive compositions capable of being mixed in a 1:1 ratio and also having practical storage life or shelf life heretofore have not been as elastic or ductile as adhesives with the common but less practical 10:1 mix ratio. This is especially evident upon aging of the adhesive over time or at elevated temperatures. The latter compositions generally employ benzoyl peroxide as the primary initiating species. The earliest and most widely used catalyst combination comprises benzoyl peroxide and a tertiary aromatic amine. The amine is generally incorporated in the polymer and monomer mixture, and the benzoyl peroxide is supplied separately and added to the monomer composition at the time of use. The mixing ratio of monomer composition to peroxide is typically from about 100:1, if pure BPO is used, to about 10:1 or less, if it is diluted with a plasticizer for more convenient mixing. The minimum practical ratio of monomer composition to peroxide component is about 4:1, because the inert plasticizer and other ingredients in the peroxide component have a negative effect on the properties of the cured composition. Benzoyl peroxide is not stable when mixed with methacrylate monomers. Stability of the peroxide catalyst species in admixtures with methacrylate mixtures is necessary for safe and practical storage prior to use in typical 1:1 mix ratio formulations. For this reason, benzoyl peroxide is not a catalyst component in the preferred embodiments of the inventive compositions.

Commercial and prior art methacrylate adhesives with a 1:1 mix ratio typically employ an initiator system comprising a sulfonyl chloride initiating species, a hydroperoxide or other stable non-BPO co-initiating species, and an amine-aldehyde activator. The initiating species are included in the adhesive portion or component A of the adhesive, and the aldehyde-amine activator is included in the activator portion or component B of the adhesive. A common source of sulfonyl chloride is chlorosulfonated polyethylene, sold commercially as Hypalon by duPont. A preferred aldehyde-amine activator is Reillcat ASY-2, a reaction product of butyraldehyde and aniline that is enriched in the content of the active dihydropyridine component, generically referred to as DHP.

While the hydroperoxide/sulfonyl chloride/DHP curing system has provided a means of producing adhesives with a convenient and non-critical 1:1 mix ratio, the resulting formulations have not been preferred for the most demanding structural adhesives applications. This is because these formulations are typically more rigid and may become brittle upon aging relative to compositions cured with BPO and tertiary amines. Therefore, there is a recognized need for adhesives with a convenient 1:1 mix ratio and a high degree of flexibility and retained flexibility after aging. It has now been discovered that specific block copolymers of styrene, butadiene and isoprene can be used to formulate adhesive compositions with these desired characteristics using components that provide a convenient 1:1 mix ratio. Further, in preferred embodiments, these compositions can be formulated without the use of benzoyl peroxide.

U.S. Pat. No. 4,574,142 to Charnock discloses toughened two-part acrylic monomer based adhesive compositions that employ styrene-butadiene (SBS) block copolymer rubbers. Only block copolymers of styrene and butadiene are disclosed, and no preference for the relative ratios of butadiene or styrene, or structure of the polymer is disclosed. An aldehyde-amine component is used as part of the curing catalyst system. However, it is specified that the compositions include a free-radical catalyst system that is free from organic sulfonyl chloride. Sulfonyl chlorides and polymers containing sulfonyl chlorides, such as chlorosulfonated polyethylene, which are preferred accelerators for prior art adhesives, are specifically excluded from the compositions. Polychloroprene, another chlorinated polymer used in prior art compositions, is also disclosed, which has undesirable effects. Thus, Charnock either excludes or teaches away from any chlorine bearing species in the compositions, especially sulfonyl chlorides.

U.S. Pat. No. 5,206,288 discloses improvements in low temperature flexible bond properties with compositions that combine elastomers with low glass transition temperatures Tg and core-shell impact modifiers. In one embodiment employing Kraton in a formulation mixed in an approximately 1:1 mix ratio, the catalyst system comprises BPO paste as an additive in one polymer in monomer component and a tertiary amine, N,N-dimethyl-p-toluidine in the other. BPO is not a preferred component of the compositions of the preferred embodiments.

U.S. Pat. No. 6,989,416 discloses methacrylate adhesives with improved flexibility based on block copolymers of styrene and butadiene. The adhesives contain peroxides and tertiary amine initiators but do not contain sulfonyl chlorides or any other sulfur bearing components or DHP components. Further, they preferably utilize benzoyl peroxide paste as the catalyst component in a mix ratio of 10:1.

SUMMARY OF PREFERRED EMBODIMENTS OF THE INVENTION

Preferred embodiments of this invention provide two-part structural adhesive compositions that exhibit improved elasticity and retention of elasticity. The adhesive compositions are mixtures of acrylate or methacrylate monomers and polymers that comprise
- A. one or more acrylate or methacrylate ester monomers,
- B. a sulfur bearing compound, preferably a sulfonyl chloride,
- C. an amine promoter, preferably an amine aldehyde reaction product,
- D. a thermoplastic block copolymer component selected from a group consisting of
  - a. a linear styrene-butadiene-styrene copolymer
  - b. a radial styrene-butadiene-styrene block copolymer plus a plasticizer
  - c. a linear or radial styrene-isoprene-styrene block copolymer, and d. a linear or radial styrene-butadiene-isoprene-styrene block copolymer, and E. optionally, an adhesion promoting polymer, preferably a chlorinated polymer.

The compositions are particularly well suited for formulation as ambient temperature curing adhesives with a convenient 1:1 mix ratio. While it is not required for the compositions to be mixed in a 1:1 mix ratio to benefit from the advantages of this invention, this is a highly preferred and practical feature for commercial products. Further, these embodiments do not require the presence of benzoyl peroxide.

DETAILED DESCRIPTION OF THE INVENTION

It has now been discovered that an important element useful for improved and permanent elasticity in formulations capable of more convenient 1:1 ratio mixing is a thermoplastic block copolymer component utilized in combination with certain free radical initiation systems. Preferred thermoplastic block copolymer components are selected from a group consisting of a. a linear styrene-butadiene-styrene copolymer with a styrene content from about 20 percent to about 45 percent b. a radial styrene-butadiene-styrene block copolymer with a styrene content from about 20 percent to about 45 percent plus a plasticizer c. a linear or radial styrene-isoprene-styrene block copolymer with a styrene content from about 10 percent to about 45 percent, and d. a linear or radial styrene-butadiene-isoprene-styrene block copolymer with a styrene content from about 10 percent to about 45 percent.

Examples of acceptable thermoplastic block copolymers are sold commercially by Kraton Polymers, Inc. under the Kraton™ trade name, by Dexco Polymers under the trade name Vector™, and by others. The preferred free radical initiation systems include sulfur bearing compounds, preferably sulfonyl chlorides or sulfimides, combined with a dihydropyridine.

When the inventive compositions are formulated as adhesives, an adhesion promoting polymer is preferably used to improve the bond strength of the cured compositions on a variety of plastic, metallic ceramic, wood or other materials or combinations of materials. The choice of adhesion promoting polymers depends upon the nature of the materials to be bonded and the required physical properties of the cured adhesive composition.

Preferred adhesion promoting polymers are thermoplastic resins and elastomers that are soluble or dispersible in the methacrylate monomers. Preferred polymers for this purpose are disclosed in U.S. Pat. No. 4,182,644, which is incorporated herein by reference. More preferred adhesion-promoting polymers are chlorinated polymers, and most preferred polymers are chlorinated elastomers, including chlorosulfonated polyethylene, chlorinated polyethylene, and polychloroprene polymers. Mixtures of any or all of the preferred polymers may be employed to advantage.

Other polymers that may be used to advantage in the inventive formulations are impact modifiers, preferably core-shell impact modifiers. In addition to providing improved adhesion to some materials, this class of polymers can provide additional benefits of rheological or handling properties and further improvements in the ductility or toughness of the cured compositions. The benefits of impact modifiers and in particular core-shell impact modifiers are disclosed in U.S. Pat. No. 4,536,546, which is incorporated herein by reference.

The acrylate and methacrylate monomers used in preferred embodiments of the inventive formulations are well known to those skilled in the art and disclosed in the '644 patent cited above. Most preferred monomers are methyl methacrylate monomer and higher molecular weight monomers wherein the alcohol portion of the monomer is based on a $C_6$ or higher hydrocarbon moiety. A most preferred monomer of the latter type is lauryl methacrylate. Non-methacrylate unsaturated or vinyl monomers such as styrene, vinyl toluene, alpha-methyl styrene, and others may be used as necessary to provide specific benefits such as control of cure rate.

The initiating species of a preferred embodiment of the inventive compositions include sulfur bearing compounds and peroxides. The activators of a preferred embodiment of the invention include tertiary aromatic amines, amine-aldehyde activators and active metallic species. Preferred sulfur bearing compounds include sulfonyl chlorides or chlorosulfonated polymers, such as chlorosulfonated polyethylene, and sulfimides, including benzoic sulfimide or saccharin. Preferred peroxides include hydroperoxides, such as cumene hydroperoxide and methyl ethyl ketone peroxide, benzoate esters including t-butyl perbenzoate, and other peroxidic species well known to those in the art. Benzoyl peroxide is not preferred.

Preferred activators are adducts of butyraldehyde and aniline, including products that are enriched in the active dihydropyridine (DHP) component sold commercially as Reillcat ASY-2. The compositions may also contain an organometallic species capable of increasing the reactivity and cure speed of the adhesive. Preferred active metallic species are transition metal compounds, most preferably derivatives of long chain carboxylic acids such as copper naphthenate copper octoate, or similar organometallic compounds familiar to those skilled in the art.

An important feature of the preferred embodiments of this invention is the provision of compositions that when fully cured exhibit exceptional improvements in mechanical properties over prior art compositions that are capable of formulation as 1:1 mix ratio adhesive products. When tested for bulk mechanical properties according to ASTM method D638, fully cured methacrylate adhesive compositions of the prior art display a broad and mixed range of thermoplastic, viscoelastic and elastic behaviors. These phenomena are described in US Patent Application Publication US 2005/0004303 A1, which is incorporated herein by reference. For the purpose of this discussion, the significant improvements in the preferred compositions of the preferred embodiments of this invention consist of a combination of high tensile strength and elongation at failure, coupled with a high degree of linear elasticity, recoverable deformation prior to yielding, and preferably significant strain hardening prior to failure. From the engineering standpoint, these are highly desirable features for a structural adhesive.

In addition to the polymeric components cited above, any number of additional components that are well known to those skilled in the art may be used to formulate the adhesive compositions of the preferred embodiments of this invention. These include non-polymeric adhesion promoters, such as polymerizable carboxylic acids and acrylated or methacrylated phosphate esters, corrosion inhibitors, including zinc and molybdate compounds, epoxy resins, fillers, plasticizers, vapor barrier waxes and the like. They may also include polyester resins and acetylenic alcohols.

Preferred compositions comprise (A) about 20 percent to about 90 percent of a methacrylate monomer, (B) about 0.02 to about 30 percent of a sulfur bearing compound or a chlorosulfonated polymer, (C) about 0.05 percent to about percent of an amine promoter, preferably a dihydropyridine, and (D) about 5 percent to about 50 percent of a thermoplastic block copolymer component. Additional promoters may be added as needed, particularly adhesion promoters. The use of benzoyl peroxide is not preferred.

The preferred embodiments can be further understood from a review of the following examples. However, the Examples are not intended to limit the scope of the invention in any way.

Experimental Procedures

Preparation of the Methacrylate Solutions

Stock solutions of thermoplastic block copolymers are prepared in one gallon glass jars by using a jar roller to dissolve sufficient quantities of polymer in methyl methacrylate to provide solutions with concentrations ranging from about 30-45%. For individual examples, the final viscosity is adjusted by adding additional MMA after additional formulating ingredients are added. Just prior to making the test specimens, the DHP component or BPO component is added as the final additive to initiate the polymerization.

Preparation of the Test Specimens

Bulk stress-strain properties of the adhesives are measured according to AS™ test method D638. Test specimens are prepared by mixing a sufficient quantity of adhesive to prepare a uniformly flat film of adhesive approximately 6 to 7 inches in diameter and approximately 0.125 inches thick. The adhesive components are combined in the specified ratios by simple hand mixing in a beaker. After the adhesive is thoroughly mixed, the beaker is placed in a vacuum chamber and vacuum is applied intermittently to remove air until the last one or two applications of vacuum does not produce additional frothing or expansion. The adhesive is then transferred to one of two glass or plastic plates approximately 12 inches in diameter with a similar sized layer of Mylar release film on top of it. The adhesive is placed in the center of the film, and a mating Mylar film and plate are placed over the adhesive and pressed down uniformly to spread the film. Metal shims are placed around the perimeter of the plates to establish the desired film thickness.

After the films are cured, the plates are removed. Test dumbbells are cut from the films as specified in the test method, taking care to cut the specimens from the most void-free section of the film. The films are allowed to cure overnight at ambient temperature followed by a thermal postcure at 82° C. for one hour prior to cutting the dumbbells. Each test number is the average of five individual test specimens.

Examples 1-5 compare preferred formulations (2-4) with a prior art formulation (5). Comparison of examples and 2 illustrates the effect of added plasticizer to provide the desired properties when the thermoplastic block copolymer is a radial SBS block copolymer.

| | EXAMPLES | | | | |
|---|---|---|---|---|---|
| | 1 | 2 | 3 | 4 | 5 |
| Component | | | | | |
| MMA Monomer | 63.81 | 53.85 | 58.50 | 59.25 | 61.50 |
| Methacrylic Acid | 5.00 | 5.00 | 5.00 | 5.00 | 5.00 |
| Kraton D 1116 | 27.35 | 27.40 | | | |
| Kraton D 1101 | | | 31.50 | | |
| Kraton D 1111 | | | | 31.90 | 33.00 |
| DOP | | 10.00 | | | |
| p-TSCl | 3.00 | 3.00 | 3.00 | 3.00 | |
| CHP | 0.75 | 0.75 | 0.50 | 0.75 | |
| DHP | 2.50 | 2.50 | 2.40 | 2.50 | |
| HET | | | | | 0.5 |
| CuAcAc Soln | 0.10 | 0.10 | 0.10 | 0.10 | |
| Benox B55 | | | | | 2.5 |
| Tensile Properties ASTM D638 after 82° C./1 hr postcure | | | | | |
| Tensile stress (psi) | 1190 | 905 | 1545 | 1295 | 1467 |
| Elongation, % | 91.8 | 407 | 342 | 534 | 100 |
| Strain harden Y/N | No | Yes | Yes | Yes | No |

| Block Copolymer | | | | | |
|---|---|---|---|---|---|
| Type | | | | | |
| | SBS | SBS | SBS | SIS | SIS |
| Linear/Radial | Radial | Radial | Linear | Linear | Linear |
| Plasticizer Y/N | No | Yes | No | No | No |

| Other Components | | |
|---|---|---|
| MMA Monomer | Methyl methacrylate monomer | Lucite |
| Kraton Polymers | Thermoplastic block copolymer | Kraton |
| DOP | Dioctylphthalate plasticizer | Aldrich |
| p-TSCl | p-Toluenesulfonyl chloride | Aldrich |
| CHP | Cumene Hydroperoxide | Hercules |
| DHP | Enriched dihydropyridine (DHP) | Reilly Industries |
| HET | N,N-bis Hydroxyethyl Toluidine | Bayer |
| CuAcAc solution | 0.5% solution of copper acetyl Acetonate in MMA monomer | Laboratory Prep/Aldrich |
| Benox B55 | 55% Benzoyl peroxide/benzoate Plasticizer | Norac |

Particularly preferred compositions are shown in Examples 2, 3 and 4.

The invention claimed is:

1. A two-part adhesive composition comprising a component A adhesive portion and a component B activator portion, which portions are capable of being mixed in a 1:1 ratio to form elastic or ductile adhesives with improved properties, wherein component A comprises methyl methacrylate monomer and a free radical initiating species comprising a sulfur bearing compound selected from the group consisting of chlorosulfonated polymers, sulfonyl chloride and sulfimides, and a peroxide, wherein the peroxide is free of benzoyl peroxide, and component B comprises methyl methacrylate monomer and an amine promoter selected from the group consisting of tertiary aromatic amines and amine-aldehyde promoters, wherein either component A or component B or both further comprise a thermoplastic block copolymer component selected from the group consisting of a. a linear styrene-butadiene-styrene block copolymer,
b. a linear styrene-isoprene-styrene block copolymer,
c. a linear styrene-butadiene-isoprene-styrene block copolymer, and mixtures thereof, wherein either component A or component B or both further comprise an adhesion promoting polymer, wherein component B does not include a chlorosulfonated polymer and wherein either component A or B or both further comprise a core shell impact modifier.

2. The two-part adhesive composition of claim 1 wherein the sulfur bearing compound is selected from the group consisting of sulfonyl chloride and sulfimide.

3. The two-part adhesive composition of claim 1 wherein the thermoplastic block polymer component of claim 1 further comprises an adhesion promoting polymer.

4. The two-part adhesive composition of claim 1 wherein the adhesion promoting polymer comprises a chlorinated polymer selected from the group consisting of chlorosulfonated polyethylene, chlorinated polyethylene, polychloroprene polymers and mixtures thereof.

5. The two-part adhesive composition of claim 1 further comprising an initiator selected from the group consisting of sulfur bearing compounds, peroxides and mixtures thereof.

6. The two-part adhesive composition of claim 1, wherein the methyl methacrylate monomer comprises 20 to 90% by weight of the composition; the sulfur bearing compound comprises 0.02 to 30% by weight of the composition; the amine promoter comprises 0.05 to 10% by weight the composition; and the thermoplastic block copolymer component comprises 5 to 50% by weight of the composition.

7. The two-part adhesive composition of claim 1, wherein the sulfur bearing compound comprises a sulfonyl chloride.

8. The two-part adhesive composition of claim 1, wherein the amine-aldehyde promoter comprises an amine aldehyde reaction product.

9. The two-part adhesive composition of claim 1 further comprising a cure initiation system selected from the group consisting of cumene hydroperoxide, methyl ethyl ketone peroxide, benzoate peresters, and mixtures thereof.

10. The two-part adhesive composition of claim 1 wherein the amine-aldehyde promoter comprises dihydropyridine.

* * * * *